(12) United States Patent
Oda et al.

(10) Patent No.: US 11,753,084 B2
(45) Date of Patent: Sep. 12, 2023

(54) VEHICLE BODY STRUCTURE

(71) Applicant: NISSAN MOTOR CO., LTD., Yokohama (JP)

(72) Inventors: Takashi Oda, Kanagawa (JP); Shinichiro Takemoto, Kanagawa (JP); Toshikazu Torigaki, Kanagawa (JP); Naoya Matsuoka, Kanagawa (JP); Zhe Jiang, Kanagawa (JP); Masaki Koyama, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 128 days.

(21) Appl. No.: 17/422,869

(22) PCT Filed: Jan. 18, 2019

(86) PCT No.: PCT/IB2019/000074
§ 371 (c)(1),
(2) Date: Mar. 1, 2022

(87) PCT Pub. No.: WO2020/148563
PCT Pub. Date: Jul. 23, 2020

(65) Prior Publication Data
US 2022/0194485 A1    Jun. 23, 2022

(51) Int. Cl.
*B62D 29/00* (2006.01)
*B62D 25/02* (2006.01)
(Continued)

(52) U.S. Cl.
CPC ......... *B62D 29/004* (2013.01); *B62D 25/025* (2013.01); *B62D 25/06* (2013.01); *B62D 25/08* (2013.01); *B62D 25/2036* (2013.01)

(58) Field of Classification Search
CPC .. B62D 29/001; B62D 29/004; B62D 25/025; B62D 25/06; B62D 25/08; B62D 25/2036; B62D 25/2018; B62D 25/02; B62D 25/20
(Continued)

(56) References Cited

U.S. PATENT DOCUMENTS

| 8,383,242 B2 * | 2/2013 | Malek ..................... C08L 77/06 |
| | | 114/355 |
| 8,991,900 B2 * | 3/2015 | Yamaji ................. B62D 29/048 |
| | | 296/900 |

(Continued)

FOREIGN PATENT DOCUMENTS

| CA | 2599560 C | * | 4/2011 | ........... B29C 70/443 |
| CN | 101786470 B | * | 3/2014 | ............. B62D 25/02 |
| WO | WO-2012105716 A1 | * | 8/2012 | ............. B62D 23/00 |

*Primary Examiner* — Dennis H Pedder
(74) *Attorney, Agent, or Firm* — Foley & Lardner LLP

(57) ABSTRACT

A vehicle body structure includes a body side section (1) configured of a first composite component (10) and a body lower section (2) configured of a second composite component (20). Each of the first and second composite components (10, 20) comprises a metal plate (11, 21) and a fiber reinforced thermoplastic portion (12, 22) that contains discontinuous fibers. The fiber reinforced thermoplastic portion (12) of the first composite component (10) includes a lining layer formed on the metal plate (11) and reinforcing ribs raised from the lining layer. The fiber reinforced thermoplastic portion (22) of the second composite component (20) includes a planar portion (24) infilled in an opening (23) opened on the metal plate 21. The discontinuous fibers in the fiber reinforced thermoplastic portion (22) of the second composite component (20) are longer than the discontinuous fibers in the fiber reinforced thermoplastic portion (12) of the first composite component (10).

13 Claims, 7 Drawing Sheets

(51) Int. Cl.
*B62D 25/20* (2006.01)
*B62D 25/06* (2006.01)
*B62D 25/08* (2006.01)

(58) Field of Classification Search
USPC ... 296/203.01, 2, 3, 193.05, 193.07, 193.09, 296/210; 293/102, 120, 121
See application file for complete search history.

(56) References Cited

U.S. PATENT DOCUMENTS

| | | | |
|---|---|---|---|
| 9,598,111 B2* | 3/2017 | Lang | B62D 25/025 |
| 2006/0165972 A1* | 7/2006 | Chimelak | B32B 5/18 |
| | | | 428/319.3 |
| 2015/0291228 A1* | 10/2015 | Huber | B62D 29/043 |
| | | | 296/181.2 |

* cited by examiner

VEHICLE BODY STRUCTURE

TECHNICAL FIELD

The present invention relates to a vehicle body structure.

BACKGROUND ART

Various vehicle body structures configured of metal and fiber reinforced plastic (FRP) are developed. There is a production vehicle having a vehicle body structure in which a portion made of metal (e.g. a front section of the vehicle body) and a portion made of carbon fiber reinforced plastic (CFRP) (e.g. a passenger compartment section) are adjoined together. In addition, a Patent Literature 1 listed below discloses a vehicle body structure configured of a composite component(s) of metal and thermoplastic resin (such as a B-pillar and a side sill). In the vehicle body structure disclosed in the Patent Literature 1, the vehicle body is made by using composite parts in which a metal plate is reinforced by ribs integrally molded on the metal plate.

PRIOR-ART LITERATURE

Patent literature

Patent Literature 1: Specification of U.S. Pat. No. 8,383,242

SUMMARY OF INVENTION

Problem to be Solved by the Invention

However, in the composite parts disclosed in the Patent Literature 1, its reinforcing resin used in the composite parts is mere thermoplastic resin, and is not fiber reinforced thermoplastic resin. The Patent Literature 1 does not disclose any technical study on a vehicle body structure using composite components in which metal is reinforced by fiber reinforced thermoplastic resin.

An object of the present invention is to provide a vehicle body structure that can bring preferred strength and stiffness by using composite parts of metal and fiber reinforced thermoplastic resin adequately at sections of a vehicle body.

Means for Solving the Problem

An aspect of the present invention provides a vehicle body structure that includes a body side section configured of a first composite component and a body lower section configured of a second composite component. Each of the first and second composite components comprises a metal plate and a fiber reinforced thermoplastic portion containing discontinuous fibers. The fiber reinforced thermoplastic portion of the first composite component includes a lining layer formed on the metal plate and reinforcing ribs raised from the lining layer. The fiber reinforced thermoplastic portion of the second composite component includes a planar portion infilled in an opening opened on the metal plate. The discontinuous fibers in the fiber reinforced thermoplastic portion of the second composite component are longer than the discontinuous fibers in the fiber reinforced thermoplastic portion of the first composite component. Note that the phrase "configured of" does not exclude other configurational elements.

Effects of the Invention

According to the above aspect, it becomes possible to give preferred strength and stiffness to a vehicle body structure by using composite parts of metal and fiber reinforced thermoplastic resin adequately at sections of a vehicle body (a body side section and a body lower section).

DESCRIPTION OF EMBODIMENTS

Figure 1:
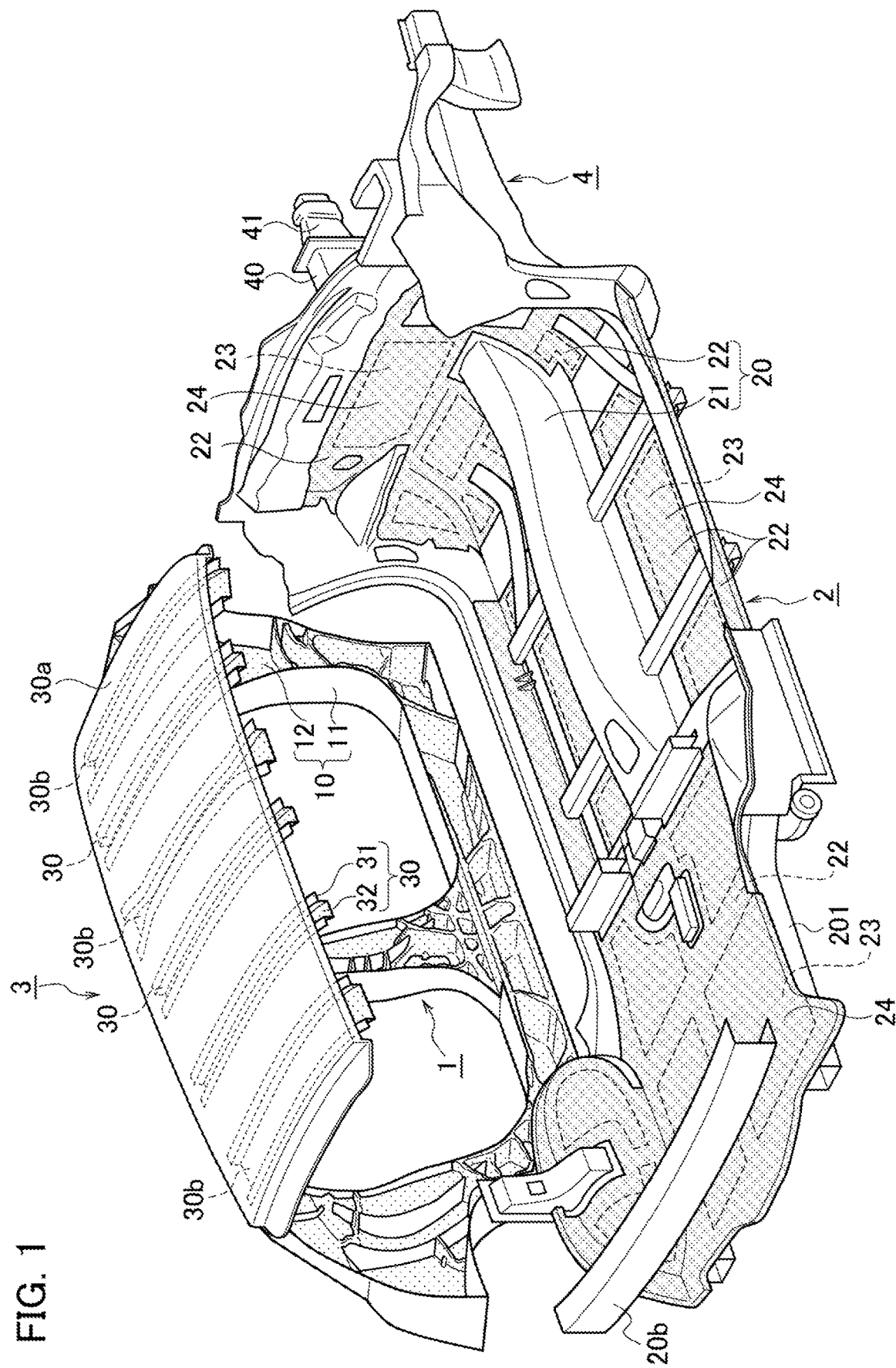
FIG. 1 is an exploded perspective view of a vehicle body configured by a vehicle body structure according to an embodiment.

A vehicle body structure according to an embodiment will be explained with reference to the drawings. As shown in FIG. 1, the vehicle body structure in the present embodiment is a vehicle body structure of a passenger car, and is configured of body side sections 1, a body lower section 2, a body upper section 3 and a body front section 4.

Each of the body side sections 1, the body lower section 2 and the body upper section 3 is configured of a composite component(s) made of a metal plate and a fiber reinforced thermoplastic portion (hereinafter, called as the FRTP portion) containing the discontinuous fibers. Note that the body front section 4 is made of metal similarly to a conventional vehicle body structure. In the present embodiment, carbon fibers are used as reinforcing fibers in the above-mentioned FRTP portion (CFRTP). But, fibers other than carbon fibers can be used as the reinforcing fibers in the above-mentioned FRTP portion (e.g. grass fibers, boron fibers, aramid fibers).

As explained above, the carbon fibers in the CFRTP are used as the discontinuous fibers. That is, in the present embodiment, the carbon fibers are not used as continuous fibers used in an autoclave method and an RTM method, but is used by being cut to have a certain length and then being mixed with the thermoplastic resin. The thermoplastic resin that has been mixed with the carbon fibers as the discontinuous fibers is integrally molded with the metal plate to form the composite component. This method for forming the composite component varies depending on the sections of the vehicle body structure (explained later in detail).

Figure 2:
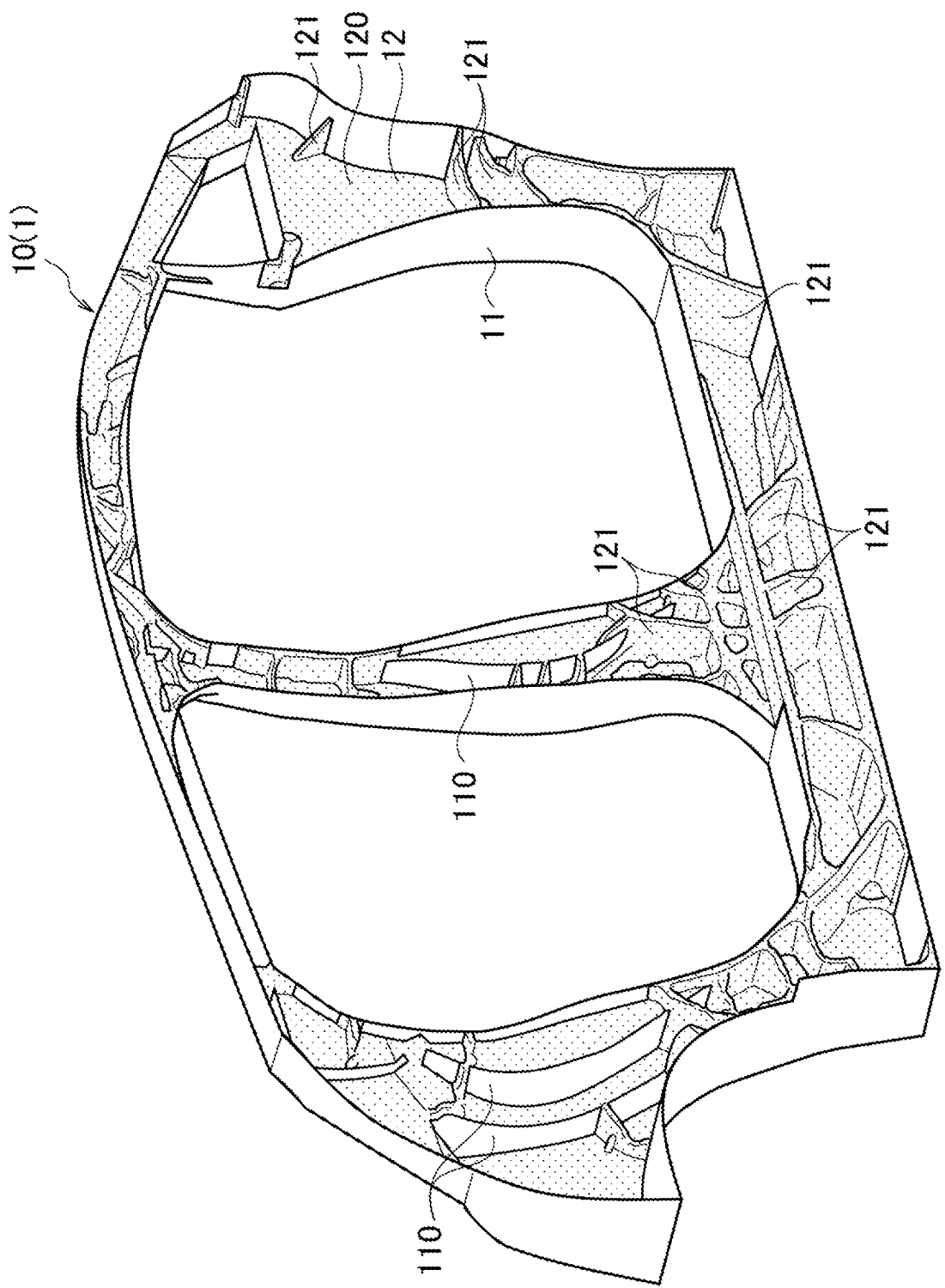
FIG. 2 is a perspective view of a body side section in the vehicle body structure.

First, the body side section(s) 1 will be explained. FIG. 2 shows an outer side panel (first composite component) 10 that is one of the composite components that configures the body side section 1. Other than the outer side panel 10, the body side section 1 also includes an inner side panel 10*a* (only partially shown in FIG. 4) that is adjoined with a passenger compartment side of the outer side panel 10. The inner side panel 10*a* is also the first composite component. The outer side panel 10 is configured of a metal plate 11 and an FRTP portion 12 containing the discontinuous fibers. The inner side panel 10*a* is also configured of a metal plate 11*a* and an FRTP portion 12*a* containing the discontinuous fibers. As explained above, the PRTP portion 12 (12*a*) is integrally molded with the metal plate 11 (11*a*).

Specifically, in the first composite component, the FRTP portion 12 is integrated with the metal plate 11 by so-called outsert molding. In the outsert molding, similarly to insert molding, the metal plate 11 is preliminarily set in a molding die of an injection molding machine, and then thermoplastic resin that has been mixed with carbon fibers is injected into the molding die to form the outer side panel 10. Insert molding is generally used for embedding a metal part(s) (metal insert(s)) in a part of a molded resin part. In a case of covering a part of a metal part by resin like as the present embodiment, the term outsert molding is used. In this manner, the metal plate 11 and the FRTP portion 12 are integrated directly with each other by outsert molding without using adhesives, and thereby strength and stiffness of the first composite component (i.e. the body side section 1 that uses it) is not degraded.

For the injection molding of the thermoplastic resin that has been mixed with the carbon fibers, the fiber length of the carbon fibers should be short in some degree. If the fiber length of the carbon fibers is too long, they will be stuck in the injection molding machine. In the present embodiment, the fiber length of the carbon fibers used for the outsert molding is 0.1 to 3.0 mm. It is impossible to give desired strength and stiffness to the FRTP portion 12 (CFRTP) when it is shorter than 0.1 mm, and the injection molding gets difficult to be done as explained above when it is longer than 3.0 mm (or a special injection molding machine is required).

The carbon fibers loaded into the injection molding machine are cut by a screw in the injection molding machine that feeds thermoplastic resin to an injection port so as to have the above-mentioned length. The cut carbon fibers are mixed with the thermoplastic resin at an upstream from the injection port. Since the outsert molding is injection molding using the molding die, flexibility of a shape of a molded resin portion (molding flexibility) is high and it is possible to form ribs (reinforcing ribs) 121 at locations that need strength and (or) stiffness. The FRTP portion 12 also includes a lining layer 120 on the metal plate 11 in order to provide the ribs 121, and the ribs 121 are raised from this lining layer 120 (integrally molded with).

Conventionally, strength and (or) stiffness are given to desired locations by using a high tensile steel plate or a ultra-high tensile steel plate as the metal plate 11 or adding many reinforcing members (reinforcing patches) made of metal. However, in the present embodiment, strength and (or) stiffness can be effectively given to desired locations by providing the ribs 121 or adjusting thickness of the lining layer 120. Recently, structural analysis (such as FEM analysis) using CAE is generally utilized for developing a vehicle body structure, so that the FRTP portion 12 can give strength and (or) stiffness effectively to the body side section 1 by providing the ribs 121 or adjusting the thickness of the lining layer 120 based on the analysis results.

Note that a metal member (metal plate) 110 is also used in the outer side panel 10 as a reinforcing member. The metal member 110 is integrated with the metal plate 11 by the FRTP portion 12 to give strength and (or) stiffness to the body side section 1. The metal member 110 is inserted into a molding die when injection-molding the FRTP portion 12. In addition, in the body side section 1 of the present embodiment, an amount of the fiber reinforced thermoplastic resin used in the ribs 121 provided on a lower side of the vehicle body is larger than an amount of the fiber reinforced thermoplastic resin used in the ribs 121 provided on an upper side of the vehicle body.

Here, an upper portion higher than the center of the height of the body side section 1 installed on the vehicle body is the "the upper side of the body side section 1 (vehicle body)", and a lower portion lower than the center is the "the lower side of the body side section 1 (vehicle body)". Rigidity against a so-called side impact (an impact to the side by another vehicle) is required for the body side section 1. The body front section 4 can absorb impact energy upon a frontal collision (a collision of the body front section 4 toward another vehicle or an obstacle) by collapsing the body front section 4. However, with respect to the side impact, there is no space for absorbing the impact energy, and thereby the rigid structure is required in order to avoid the other car from entering into a passenger compartment (survival space).

Figure 3:
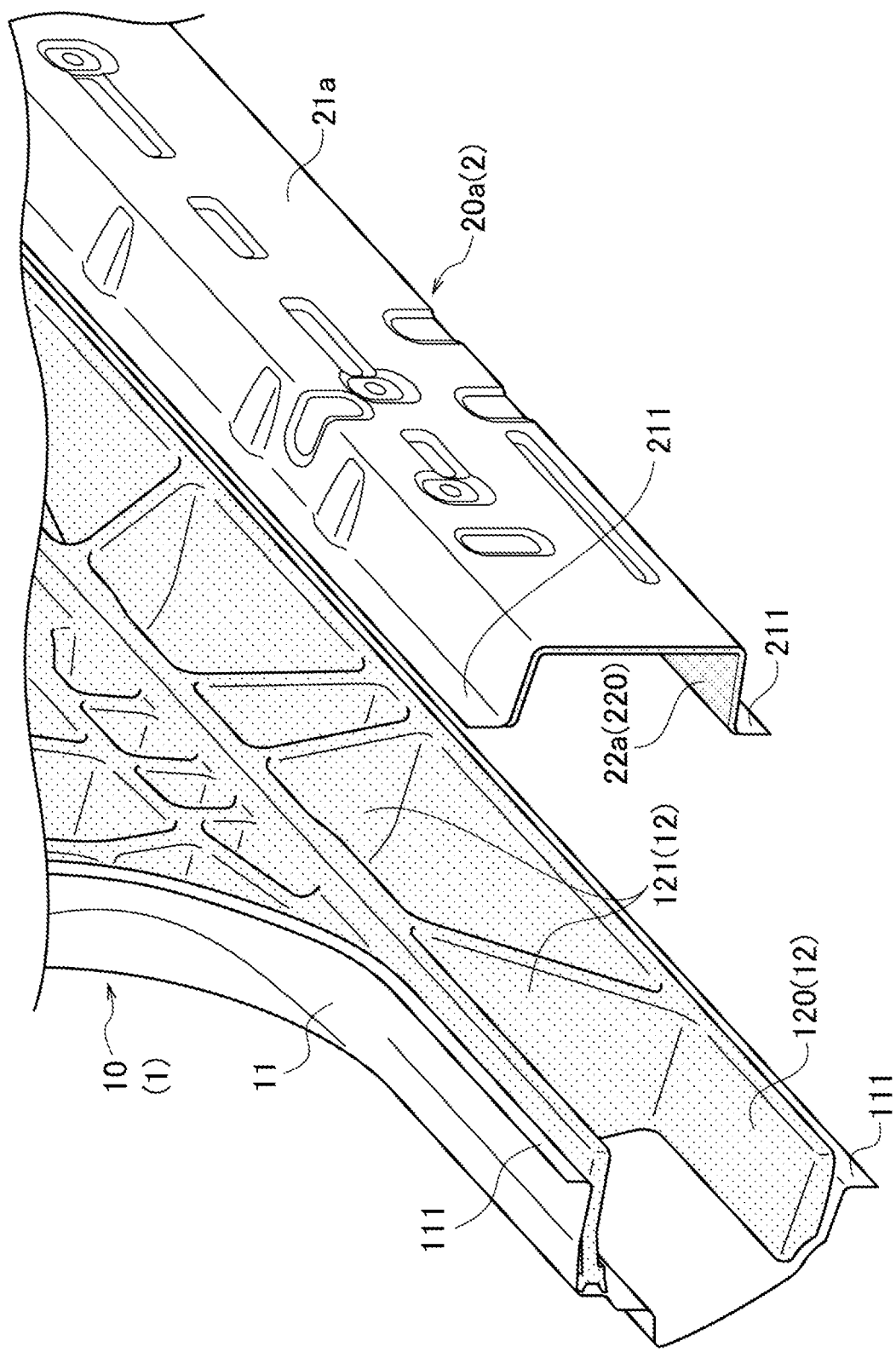
FIG. 3 is an enlarged exploded perspective view of a side sill in the vehicle body structure.

Therefore, as shown in FIG. 2 and FIG. 3, the rigid structure is given to the body side section 1 against the side impact by especially reinforcing lower portions of an A-pillar, a B-pillar and a C-pillar concentratively. Here, a lot of the ribs 121 are provided and the ribs 121 are made thick in order to reinforce the lower portions of the pillars. As the result, local deformation of the body side section 1 upon the side impact can be restricted, and multi-load paths for effectively transferring the side impact load to the body lower section 2 are constructed.

Therefore, in the present embodiment, the amount of the fiber reinforced thermoplastic resin used in the ribs 121 provided on the lower side of the body side section 1 is made larger than the amount of the fiber reinforced thermoplastic resin used in the ribs 121 provided the upper side thereof. In addition, it is also known that the reinforcement of the lower portion of the A-pillar is effective against a so-called small offset crash. Note that upper portions of the pillars are also reinforced by the ribs 121 as shown in the drawings and it is also known that the reinforcement of the upper portions of the pillars is also effective against the side impact.

Note that the "amount of the fiber reinforced thermoplastic resin" mentioned here is an amount of the CFRTP used in the ribs 121, and it's indifferent whether it is weight or cubic volume because identical CFRTP is used for the upper portion and the lower portion. However, since it may be considerable that different CFRTP (such as CFRTP of the body lower section 2 explained later) is used partially, the "amount of the fiber reinforced thermoplastic resin" is denoted as weight.

In addition, although the concentrative reinforcement of the lower portions of the pillars is effective against the side impact as explained above, it is also known that reinforcement of the side sill is especially effective. A reinforced structure of the side sill in the present embodiment will be explained with reference to FIG. 3 and FIG. 4.

As shown in FIG. 3, the side sill(s) in the present embodiment has a closed cross-sectional structure constructed by including not only the lower portions of the outer side panel 10 and the inner side panel 10a that are part of the body side section 1 but also a side sill inner panel (side sill inside member) 20a that is part of the after-explained body lower section 2. The side sill inner panel 20a is a second composite component configured of a metal plate 21a and an FRTP portion 22a containing the discontinuous fibers (carbon fibers). A method for forming the second composite component will be explained later together with the after-explained body lower section 2.

Here, it is considered that the lower portion of the outer side panel 10 is a side sill outer panel and the lower portion of the inner side panel 10a is a side sill inner reinforcement. In addition, it may be possible to consider that the side sill inner panel 20a is part of the body side section 1 in consideration of the built-up vehicle body, but the side sill inner panel 20a is denoted as part of the body lower section 2 in the present embodiment in consideration of the after-explained method for forming the second composite component (the side sill inner panel 20a). Note that the inner side panel 10a (side sill inner reinforcement) may not be provided along an entire length of the side sill, and may be provided partially.

In the side sill, the outer side panel 10 and the inner side panel 10a (the first composite component) and the side sill inner panel 20a (the second composite component) are adjoined to one another by spot-welding flanges 111, 111a and 211 formed on their metal plates 11, 11a and 21a. That is, the body side section(s) 1 and the body lower section 2 are adjoined by being welded at the flanges 111, 111a and 211. Note that the first composite component and the second composite component (including two of the first composite components or two of the second composite components) are adjoined by welding to one another also at portions other than the side sill(s) by flanges formed on their metal plates 11, 11a and 21a. Therefore, even when the FRTP portions 12, 12a and 22a are formed, the first composite component and the second composite component are adjoined together stably and surely by welding, which is a conventional adjoining method, at their metal plates 11, 11a and 21a.

Then, the side sill constructs a rigid structure due to the closed cross-sectional structure by the metal plates 11, 11a and 21a, the reinforcement by the inner side panel 10a (the side sill inner reinforcement), the reinforcement by the ribs 121 of the outer side panel 10 and the inner side panel 10a, and the reinforcement by the FRTP portion 22a of the side sill inner panel 20a. In addition, the lining layers 120 of the outer side panel 10 and the inner side panel 10a and lining layers 220 of the side sill inner panel 20a also contribute the rigid structure of the side sill (explained later in detail).

Figure 4:
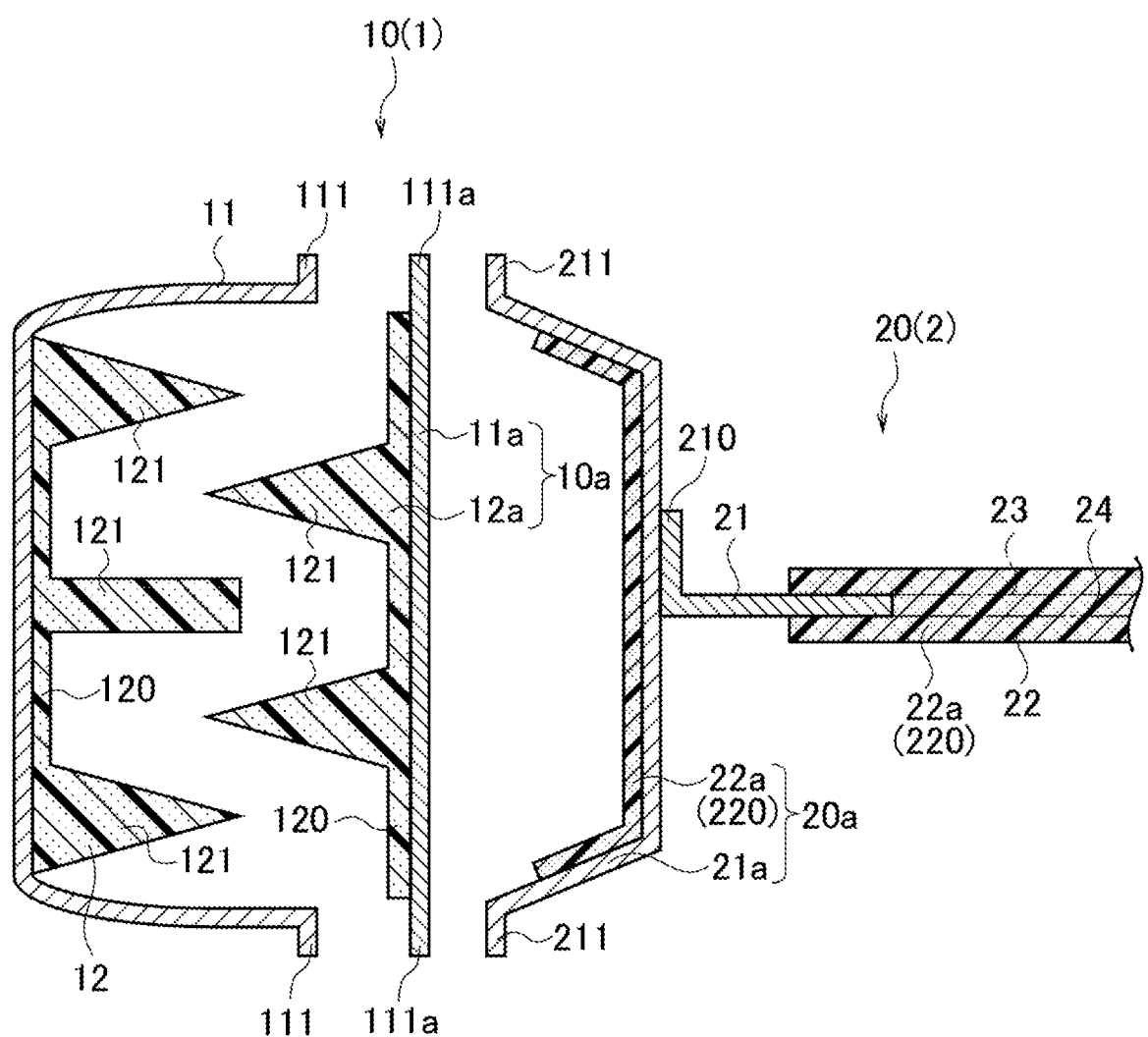
FIG. 4 is an enlarged exploded schematic cross-sectional view of the side sill in the vehicle body structure.

Next, the body lower section 2 will be explained. More specifically, the body lower section 2 is a body floor section. As shown in FIG. 1, the body lower section 2 includes a floor panel 20, the above-mentioned side sill inner panel 20a and a rear bumper reinforcement 20b as the second composite components. Here, a dash panel located between a passenger compartment and a motor compartment (an engine compartment) is part of the floor panel 20. As shown in FIG. 4, the side sill inner panels 20a are adjoined by spot-welding to both side edges of the floor panel 20, respectively.

The floor panel 20 (the second composite component) is configured of a metal plate 21 and an FRTP portion 22 containing the discontinuous fibers. The side sill inner panel 20a (the second composite component) is also configured of a metal plate 21a and the FRTP portion 22a containing the discontinuous fibers (see FIG. 4). Although explained later, the rear bumper reinforcement 20b is also configured of a metal plate 21b and an FRTP portion 22b containing the discontinuous fibers (see FIG. 7). The FRTP portion 22 (22a, 22b; hereinafter, not referred to) of the second composite components are made by a different method from a method for forming the FRTP portion 12 (12a; hereinafter, not referred to) of the first composite component.

The carbon fibers contained in the FRTP portion 22 of the second composite component(s) are longer than the carbon fibers contained in the FRTP portion 12 of the above-explained first composite component(s). Therefore, the FRTP portion 22 is difficult to be made by injection molding, and is made by LFT-D molding (Long Fiber-reinforced Thermoplastic Direct inline compound molding) (also called as D-LFT molding). Specifically, compound, which is made by mixing melted thermoplastic resin and long reinforcing fibers and then extruding the mixture, is made preliminarily, and then the compound is set in a molding die together with the metal plate 21 on a molding process line to form the FRTP portion 22 by compression molding. As the result, the metal plate 21 and the FRTP portion 22 are integrally molded with each other. Note that a shape of the metal plate 21 are preliminarily formed by a pressing process before the compression molding. In addition, a robot arm or the like is used for setting of the compound into the molding die.

Here, in the present embodiment, an opening 23 is preliminarily formed at a position on the metal plate 21 where the FRTP portion 22 is to be formed, and then this opening 23 is closed by the FRTP portion 22 made by the compression molding. Specifically, as shown in FIG. 4, inner edges of the opening 23 overlap the FRTP portion 22 to form a structure in which the FRTP portion 22 is fringed by the metal plate 21. At this overlapped portion, the metal plate 21 and the FRTP portion 22 are integrated firmly with each other by the above-mentioned compression molding. A portion within the overlapped portion, which is infilled in the opening 23 so as to close the opening 23, is a planar portion 24 (part of the FRTP portion 22).

Therefore, a volume of the metal plate 21 is reduced by forming the opening 23, and thereby light-weighting of the vehicle body can be achieved. In addition, strength and stiffness required as the floor panel 20 can be secured by the FRTP portion(s) 22 (the planar portion(s) 24) integrally formed with the metal plate 21. The carbon fibers of the FRTP portion(s) 22 are made long in order to secure the strength and the stiffness required as the floor panel 20. In the present embodiment, a length of the carbon fibers used for the LFT-D molding is set to 3.0 to 30 mm. If the length of the carbon fibers is shorter than 3.0 mm, desired strength and stiffness cannot be got. On the other hand, if the length of the carbon fibers is longer than 30 mm, it becomes hard to carry out the compression molding (to manufacture the compound) because it becomes hard to mix the carbon fibers with the thermoplastic resin.

Note that fiber reinforced thermoplastic resin mixed with long fibers is called as LFT (Long Fiber reinforced Thermoplastics) (may be also called as LFRT). On the other hand, fiber reinforced thermoplastic resin mixed with short fibers is called as SFT (Short Fiber reinforced Thermoplastics) (may be also called as SFRT). A threshold fiber length between the LFT and the SFT is not defined clearly. The threshold may change according to kinds of fibers. In the present embodiment, the LFT and the SFT are differentiated with the threshold is the fiber length 3.0 mm as explained above. In addition, the above-explained fiber length is an average length of the fibers mixed in the FRTP portion that has been molded. Therefore, the FRTP portion 12 of the first composite component(s) is made of SFT, and the FRTP portion 22 of the second composite component(s) is made of LFT. The LFT and the SFT are used as discontinuous fibers. Note that a length of fibers used in the autoclave method or the RTM method is almost identical to a maximum length of a product, and occasionally may reach several meters.

The floor panel 20 is generally provided with no downward protrusion in order to get a minimum ground clearance, and is generally provided with no upward protrusion in order to get a space volume of a passenger compartment. According to the body lower section 2 of the present embodiment, its required strength and stiffness can be secured by forming the FRTP portion(s) 22 in a planar manner (without providing ribs and so on). In addition, according to the above-explained configuration of the body lower section 2, an impact load can be received sufficiently by the floor panel 20 upon a crash such as a frontal collision or a side impact. Further, according to the FLT-D molding, it becomes possible to form a large component like the floor panel 20 easily as a composite component of metal and CFRTP.

Note that the above-explained overlapped portion of the metal plate 21 and the FRTP portion 22 is formed on both upper and bottom faces of the metal plate 21 in FIG. 4, but may be formed on only one of the upper and bottom faces as long as sufficient adjoining strength is secured. In addition, the overlapped portion is shown as being thick in FIG. 4 in order to make it easily recognized, but the overlapped portion is made flat from the metal plate 21 to the FRTP portion 22 without any stepped portion (but, it may be allowed to form a stepped portion).

Further, in the present embodiment, another composite structure, in which the above-explained opening 23 is not formed, is constructed from both edges of the floor panel 20 to the side sill inner panel 20a. First, the lining layer 220 (see FIG. 4) of the side sill inner panel 20a will be explained. Note that the lining layer 220 of the side sill inner panel 20a is not shown in FIG. 6. The above-explained LFT compound is compressively molded on the metal plate 21a by the LFT-D molding method to form the lining layer 220 on an inner surface of the side sill inner panel 20a. Therefore, the lining layer 220 (i.e. the FRTP portion 22a) is integrated with the metal plate 21a to give strength and stiffness to the side sill inner panel 20a.

Here, the carbon fibers in the lining layer 220 of the side sill inner panel 20a are oriented in a longitudinal direction (back-forth direction) of the vehicle body structure. The orientation of the carbon fibers can be controlled when extruding the LFT compound. When the LFT compound is extruded out from an extrusion port of an extruder, (although depending on a shape of the extrusion port) the carbon fibers are oriented so as to be almost perpendicular to a center axis of the extrusion port. The orientation of the carbon fibers is hardly changed by the compression molding.

In addition, the carbon fibers in the lining layer 220 of the side sill inner panel 20a are made longer than the carbon fibers in the FRTP portion 22 of the floor panel 20. By directing the carbon fibers in the lining layer 220 of the side sill inner panel 20a in the longitudinal direction of the vehicle body structure, it becomes possible to counteract effectively against an axial force applying to the side sill (e.g. upon a frontal collision) and also to counteract effectively against a lateral force applying so as to bend the side sill (e.g. upon a side impact). It becomes possible to counteract against the axial force and the lateral force mentioned above due to the longer carbon fibers in the lining layer 220 than the carbon fibers in the FRTP portion 22, and the above-explained rigid structure of the side sill can be improved further.

Figure 5:
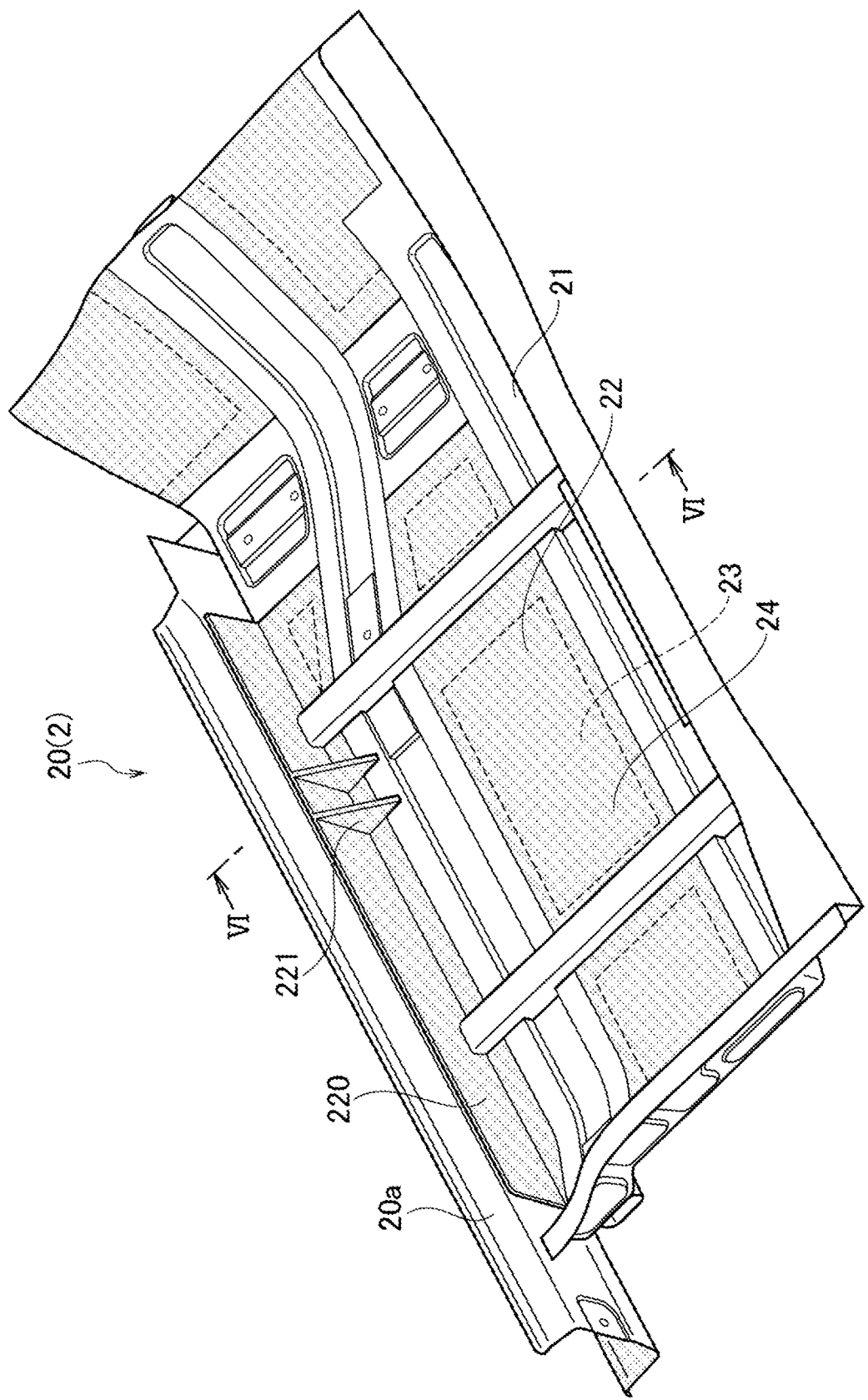
FIG. 5 is a perspective partial view of a body lower section of the vehicle body structure.
Figure 6:
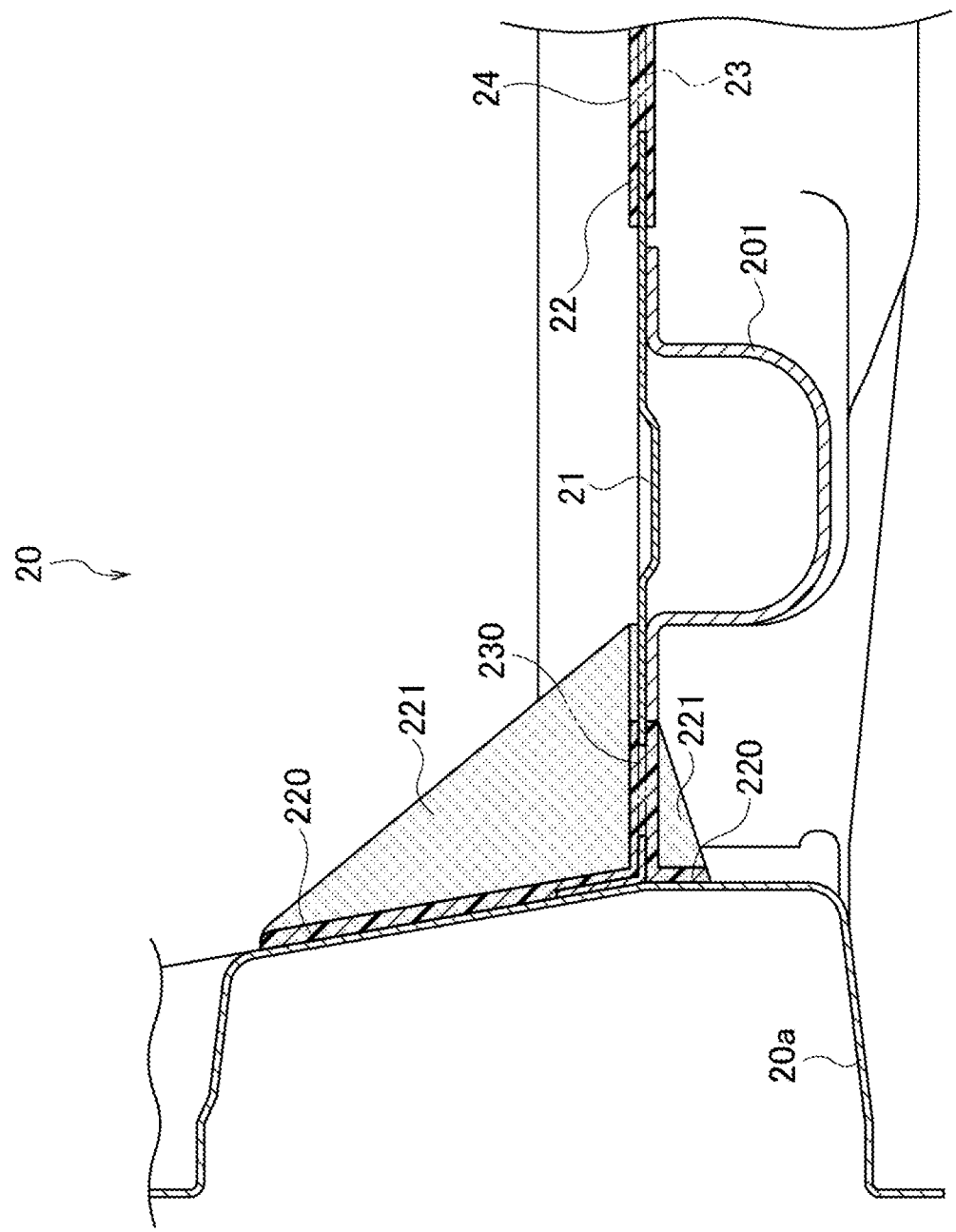
FIG. 6 is an enlarged cross-sectional view of the body lower section.

Further, in addition to the above-explained lining layer 220 located within the side sill (see FIG. 4), the lining layers 220 are also formed on the side sill inner panel 20a from the both edges of the floor panel 20 to the side sill inner panel 20a (see FIG. 5 and FIG. 6). The lining layers 220 are formed on an upper face and a bottom face of the floor panel 20. These lining layers 220 shown in FIG. 5 and FIG. 6 improve the rigid structure of the side sill and also improve strength and stiffness of the floor panel 20.

Note that only a left half of the body lower section 2 is shown in FIG. 5. In addition, the floor panel 20 can be segmented into a front panel (i.e. the above-mentioned dash panel), a center panel and a rear panel, but a rear portion of the center panel (corresponding to a portion of a rear seat) and the rear panel (corresponding to a rear luggage compartment) are not shown in FIG. 5. The FRTP portion(s) 22 can be modified.

In addition, triangular ribs (reinforcing ribs) 221 are raised from the lining layers 220 shown in FIG. 5 and FIG. 6. The triangular ribs 221 are also formed on the upper face and the bottom face of the floor panel 20. A through hole 230 is formed on a portion of the metal plate 21, where the triangular ribs 221 are formed, in order to make resin easily infilled to the upper and lower triangular ribs 221 during molding. Only two of the triangular ribs 221 are shown in FIG. 5, but they are provided appropriately at desired positions along the side sill. The triangular ribs 221 also improve the rigid structure of the side sill and also improve strength and stiffness of the floor panel 20. Note that a side member 201, which is formed by welding thick metal member on the bottom face of the floor panel 20, is also shown in FIG. 6. The metal member that forms the side member 201 is welded on the metal plate 21 of the floor panel 20 (no FRTP portion 22 is formed at the welded portion).

The lining layers 220 and the triangular ribs 221 shown in FIG. 5 and FIG. 6 also made by the LFT-D molding. In addition, the carbon fibers in the lining layers 220 are oriented in the longitudinal direction of the vehicle body structure. Moreover, the carbon fibers in the lining layers 220 are made further longer than the carbon fibers in the FRTP portion 22 (the planar portion 24). Therefore, the lining layers 220 and the triangular ribs 221 shown in FIG. 5 and FIG. 6 further improve the rigid structure of the side sill and also further improve strength and stiffness of the floor panel 20.

In other words, in the body lower section 2, an amount of the fiber reinforced thermoplastic resin used in the reinforcing ribs (triangular ribs) 221 provided along its circumferential edges is larger than an amount of the fiber reinforced thermoplastic resin used in reinforcing ribs provided in its center portion. The "center portion" mentioned here is a portion inside the circumferential edges. However, the ribs provided in the center portion are not shown in the drawings (in a case where no rib is provided in the center portion, the "amount of the fiber reinforced thermoplastic resin used in the reinforcing ribs" can be regarded as zero). According to this, strength and stiffness of the circumferential edges of the body lower section 2 can be improved, and thereby strength and stiffness of a whole of the body lower section 2, which substantially has a planar shape, can be improved.

Figure 7:
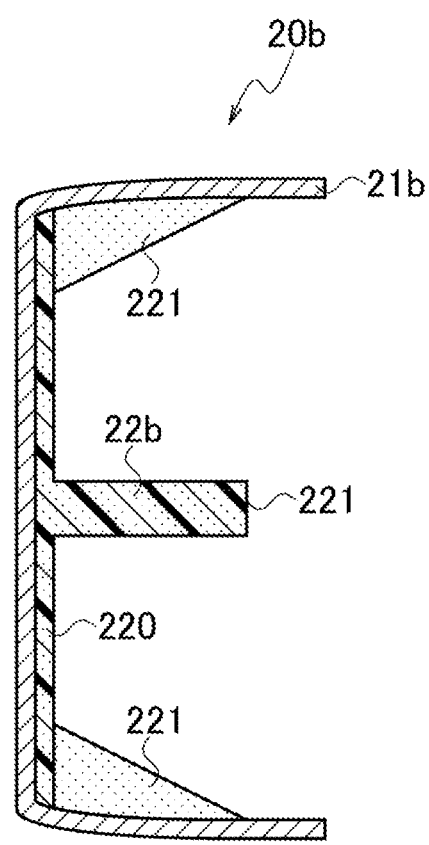
FIG. 7 is an enlarged cross-sectional view of a rear bumper reinforcing member of the body lower section.

As shown in FIG. 1, the body lower section 2 further includes the rear bumper reinforcement (rear bumper reinforcing member) 20b. The rear bumper reinforcement 20b is also the second composite component similarly to the floor panel 20 and the side sill inner panel 20a. That is, as shown in FIG. 7, the rear bumper reinforcement 20b is configured of a metal plate 21b and an FRTP portion 22b containing the discontinuous fibers (carbon fibers). In addition, the rear bumper reinforcement 20b is made by the above-explained LFT-D molding. The rear bumper reinforcement 20b is attached to rear ends of the above-mentioned side members 201 with brackets or crash-boxes interposed therebetween.

The FRTP portion 22b of the rear bumper reinforcement 20b includes the lining layer 220 provided on an inner face of the metal plate 21b and a rib (reinforcing rib) 221 and triangular ribs (reinforcing ribs) 221 raised from the lining layer 220. The lining layer 220 is formed on an inner face of a vertical plate of the metal plate 21b. Strength and stiffness of the rear bumper reinforcement 20b are improved by the lining layer 220, and the strength and the stiffness are further improved by the rib 221 and the triangular ribs 221. The rib 221 extends along a longitudinal direction of the rear bumper reinforcement 20b. The triangular ribs 221 are provided from the lining layer 220 on the vertical plate to an inner face of an upper horizontal plate of the metal plate 21b. The triangular ribs 221 are also provided from the lining layer 220 on the vertical plate to an inner face of a lower horizontal plate of the metal plate 21b. The plural triangular ribs 221 are provided along the longitudinal direction of the rear bumper reinforcement 20b. Note that the lining layer 220 may be formed not only on the inner face of the vertical plate but also on the inner faces of the upper horizontal plate and the lower horizontal plate.

The carbon fibers in the FRTP portion 22b (the lining layer 220 and the ribs 221) are oriented in a lateral direction (left-right direction) of the vehicle body structure. Controlling of the orientation of the carbon fibers is similar to that of the lining layer 220 of the side sill inner panel 20a. By directing the carbon fibers in the FRTP portion 22b in the lateral direction of the vehicle body structure, it becomes possible to counteract effectively against a force applying so as to bend the rear bumper reinforcement 20b (e.g. upon a rear-end collision). Note that the carbon fibers in the lining layer 220 of the rear bumper reinforcement 20b are made further longer than the carbon fibers of the FRTP portion 22 of the floor panel 20. The rib 221 and the triangular ribs 221 of the rear bumper reinforcement 20b are included in the above-mentioned "reinforcing ribs 221 provided along the circumferential edges of the body lower section 2".

Next, the body upper section 3 will be explained. More specifically, the body upper section 3 is a body roof section. As shown in FIG. 1, the body upper section 3 includes a roof panel 30a, roof rails 30b and roof bows 30. Depending on a vehicle body structure, roof side rails (not shown in the drawings) are included in the body upper section 3 or the body side section 1. The roof rails 30b and the roof bows 30 are welded or fastened by bolts on the roof side rails at their both ends, and their intermediate portions between the both ends are bonded on an inner face of the roof panel 30a by adhesives. Since welding spots would be made on an outer surface of the roof panel 30a in a case where the intermediate portions are welded with the roof panel 30a, the adhesives are used.

In the present embodiment, the roof rails 30b and the roof bows 30 are the first composite components, and each of them is configured of a metal plate 31 and an FRTP portion 32 containing the discontinuous fibers (carbon fibers) as shown in FIG. 1. The roof rails 30b and the roof bows 30 (the first composite components) are made by outsert molding similarly to the first composite components of the body side section 1. Here, it may be possible that only the roof bows 30 are formed as the first composite components and the roof rails 30b are made only of metal. In addition, the carbon fibers in the FRTP portion 32 are oriented in the lateral direction of the vehicle body structure.

Here, the roof rails 30b and the roof bows 30 (the first composite components) are made by injection molding as explained above. In injection molding, direction of orientation of reinforcing fibers may become different between a portion (skin layers) that makes contact with an inner face of molding die (and with a surface of the metal plate 31 in the present embodiment) and a portion (core layer) that makes no contact threrewith. The orientation of the carbon fibers in the FRTP portion 32 is the orientation of the carbon fibers in the core layer of the FRTP portion 32. The orientation of the carbon fibers in the core layer can be controlled when injecting thermoplastic resin that has been mixed with the carbon fibers.

When SFT is injected out from an injection port, (although depending on a shape of the injection port) the carbon fibers are oriented so as to be almost perpendicular to a center axis of the injection port. That is, in a case where the injection port is a single gate, the carbon fibers are oriented in a concentric manner around the injection port. In a case where the injection port is a fan gate, the carbon fibers are oriented in a parallel manner to the elongated injection port. Note that, in a case where the injection port is a single gate, the carbon fibers in the skin layer(s) are oriented in a radial manner from the injection port. In a case where the injection port is a fan gate, the carbon fibers are oriented in a perpendicular manner to the elongated injection port.

By configuring the body upper section 3 with the roof rails 30b and the roof bows 30 (the first composite components), it becomes possible to give strength and stiffness effectively to the body upper section 3. Especially in the present embodiment, the carbon fibers in the first composite components are oriented in the lateral direction of the vehicle body structure, and thereby it becomes possible to counteract effectively against a lateral force applying from the side toward the body upper section 3 (e.g. upon a side impact or a rollover).

Modified examples of the body upper section 3 will be explained. The roof panel 30a may be formed as the first composite component configured of a metal plate and an FRTP portion(s) by outsert molding. In this case, roof bows can be formed on the FRTP portion(s) by injection molding as beams having honeycomb structure (a kind of reinforcing ribs). In addition, when molding the FRTP portion(s), metal roof rails can be integrally molded by inserting it in a molding die.

Here, not forming the roof bows as the reinforcing ribs made by injection molding, the roof bows preliminarily made of CFRTP may be integrally molded by inserting them in a molding die when injection-molding the first composite component (the roof panel 30a). In this case, the carbon fibers in the roof bows preliminarily made can be easily oriented in the lateral direction of the vehicle body structure. Note that, in this case, the roof bows may be made of SFT, or may be made of LFT.

Next, the body front section 4 will be explained. The body front section 4 is a portion on a front side from the above-mentioned dash panel. Generally, an engine or a motor is accommodated in the body front section 4. The body front section 4 functions as a crushable zone that absorbs impact energy by being collapsed (ductile buckling) upon a frontal collision. The body front section 4 in the vehicle frame structure is made of metal. Metal has characteristics appropriate for absorbing impact energy by its ductile buckling mentioned above. Specifically, the body front section 4 includes side members 40 and crash boxes 41.

The side member(s) 40 extends in the longitudinal direction of the vehicle body structure toward the above-explained side member 201 of the body lower section 2. The crash box(es) 41 is attached to a front end of the side member 40, and a front bumper reinforcement (not shown in the drawings) is further attached to its front end. The crash box 41 collapses upon a collision and absorbs impact energy.

The vehicle body structure of the present embodiment includes the body side section(s) 1 configured of the first composite component (the outer side panel 10) and the body lower section 2 configured of the second composite component (the floor panel 20). Each of the first and second composite components (10, 20) is configured of the metal plate (11, 21) and the FRTP portion(s) (12, 22) containing the discontinuous fibers.

Therefore, a structure, which is used to be partially reinforced partially by metal patches conventionally, can be constructed by the composite members having a composite structure of the metal plate and the FRTP portion, and thereby the number of parts can be reduced drastically. In addition to the reduction of the number of parts, light-weighting can be also brought by replacing metal with FRTP (replace the metal patches with the lining layers 120 and the reinforcing ribs 121/the planar portions 24 in the openings 23). Further, since the body side sections 1 and the body lower section 2 are made by using the composite components configured of the metal plates and (not mere resin but) the fiber reinforced thermoplastic resin, strength and stiffness of the vehicle body structure can be improved (without increasing its weight).

Furthermore, the FRTP portion(s) in the first composite component are configured to include the lining layers 120 formed on the metal plate and the reinforcing ribs 121 raised from the lining layers 120. Therefore, with respect to the body side section 1, flexibility in the shape of the FRTP portion becomes high, and thereby the reinforcing ribs 121 can be disposed at desired positions to improve strength and stiffness of the body side section 1 accurately.

On the other hand, the FRTP portions in the second composite component is configured to include the planar portions 24 that are infilled in the openings 23 to close the openings 23. Therefore, the second composite component(s) can improve strength and stiffness of the body lower section 2 while keeping its planar shape.

Here, the discontinuous fibers contained in the FRTP portion(s) of the second composite component are made longer than the discontinuous fibers contained in the FRTP potion(s) of the first composite component. In other words, since the discontinuous fibers contained in the FRTP potion of the first composite component are shorter than the discontinuous fibers contained in the FRTP portion of the second composite component, flexibility of the shape of the FRTP portion of the first composite component becomes high, and thereby the reinforcing ribs 121 can be disposed at desired positions as explained above to improve strength and stiffness of the body side section 1 accurately.

On the other hand, since the discontinuous fibers in the FRTP portion(s) of the second composite component are longer, and thereby strength and stiffness (especially, stiffness for planarity) of the body lower section 2 can be improved further (than the first composite component) by the second composite component while keeping its planar shape even if there is no space for forming reinforcing ribs. And, strength and stiffness of the vehicle body structure can be improved accurately (in addition to the reduction of the number of parts and the light-weighting) by selectively using the first composite component (high flexibility in the shape by the short fibers) and the second composite component (high strength and high stiffness by the long fibers), which have different characteristics, in the body side section 1 and the body lower section 2.

In addition, the body side sections 1 and the body lower section 2 are directly adjoined by welding the metal plate of the first composite component and the metal plate of the second composite component. That is, the FRTP portions never interfere the adjoint between the body side sections 1 and the body lower section 2, so that the body side sections 1 and the body lower section 2 can be adjoined with each other in a conventional way.

In the body side section 1 of the vehicle body structure of the present embodiment, the amount of the fiber reinforced thermoplastic resin used in the reinforcing ribs 121 provided on the lower side of the vehicle body is larger than the amount of the fiber reinforced thermoplastic resin used in the reinforcing ribs 121 provided on the upper side of the vehicle body. Therefore, strength and stiffness of the lower side of the vehicle body (especially, the lower portion of the B-pillar and the lower portion of the A-pillar) is improved concentratively by the reinforcing ribs 121. As the result, local deformation of the body side section 1 upon a side impact is restricted, and multi-load paths for effectively transferring the side impact load to the body lower section 2 are constructed. In addition, a position of the center of gravity of the vehicle is lowered, and thereby the vehicle dynamic performance can be improved.

In the vehicle body structure of the present embodiment, the body lower section 2 also includes the side sill inner panel (side sill inside member) 20a as the second composite component (in addition to the floor panel 20). The FRTP portions 22a formed along the side sill inner panel 20a include the lining layers 220 formed on the metal plates (21, 21a) and the reinforcing ribs (triangular ribs) 221 raised from the lining layers 220. The amount of the fiber reinforced thermoplastic resin used in the reinforcing ribs 221 provided along the circumferential edges of the body lower section 2 is larger than the amount of the fiber reinforced thermoplastic resin used in the reinforcing ribs provided in the center portion of the body lower section 2. Therefore, strength and stiffness of the circumferential edges of the body lower section 2, which is part of the frame structure of the vehicle body, can be improved specifically. As the result, deformation of the vehicle body caused by various static and dynamic forces that are input to the vehicle body can be restricted effectively. In addition, the multi load paths for effectively transferring the impact load are constructed by the reinforcing ribs 221 provided specifically along the circumferential edges, and thereby the side impact load can be received by a whole of the body lower section 2.

Here, in the vehicle body structure of the present embodiment, the lining layers 220 made of the fiber reinforced thermoplastic resin are formed on the metal plate 21a of the side sill inner panel 20a, and the discontinuous fibers in the lining layers 220 are oriented in the longitudinal direction of the vehicle body structure. Therefore, it becomes possible to counteract effectively against an axial force applying to the side sill (e.g. upon a frontal collision) and also to counteract effectively against a lateral force applying so as to bend the side sill (e.g. upon a side impact).

Further, the discontinuous fibers in the lining layers 220 of the side sill inner panel 20a is made longer than the discontinuous fibers in the planar portions 24. Therefore, strength and stiffness of the lining layers 220 of the side sill inner panel 20a are improved more effectively, and thereby the impact load can be received sufficiently by a whole of the body lower section 2 by constructing the multi-load paths for effectively transferring the impact load.

Furthermore, in the vehicle body structure of the present embodiment, the body lower section 2 further includes the rear bumper reinforcement (rear bumper reinforcing member) 20b as the second composite component (in addition to the floor panel 20 and the side sill inner panel 20a). The FRTP portion 22b formed on the metal plate 21b of the rear bumper reinforcement 20b includes the lining layer 220, and the discontinuous fibers in the lining layer 220 are oriented in the lateral direction of the vehicle body structure. Therefore, it becomes possible to counteract effectively against a force applying so as to bend the rear bumper reinforcement 20b (e.g. upon a rear-end collision). As the result, local deformation of the rear bumper reinforcement 20b is restricted, and the impact load can be effectively transferred to the frame structure (the side member 201) of the vehicle body.

In addition, the vehicle body structure of the present embodiment further includes the body front section 4 made of metal, and the body front section 4 is directly adjoined with the metal plate 21 of the body lower section 2 (and the metal plate 11 of the body side sections 1). Therefore, it can be adjoined surely with the body lower section 2 (the body side sections 1) in a conventional way. Since no special adjoining structure and no special adjoining method are required, costs for manufacturing the vehicle body structure can be restricted from increasing. Further, since the body front section 4 is made of metal, it can absorb impact energy efficiently upon a collision by its ductile buckling. Furthermore, although a heat generating source such as an internal combustion engine (a motor and an inverter) is accommodated in the body front section 4, the body front section 4 is made of metal that is stable against heats and thereby the vehicle body structure is hardly affected by the above-mentioned heat generating source.

In the vehicle body structure of the present embodiment, the body upper section 3 is also configured of the first composite components (the roof bows 30 and the roof rails 30b/the roof panel 30a [the modified example]), the body side sections 1 and the body upper section 3 are directly adjoined by welding the metal plates (11, 31) of the first composite components. Therefore, it becomes possible to give strength and stiffness effectively to the body upper section 3, i.e. the roof of the vehicle body. Of course, light-weighting can be brought, because an amount of metal used therefor can be reduced. In addition, the position of the center of gravity of the vehicle can be lowered by the light-weighting of the body upper section 3, and thereby the vehicle dynamic performance can be improved.

Here, the discontinuous fibers in the FRTP portions of the first composite components (the roof bows 30 and the roof rails 30b) are oriented in the lateral direction of the vehicle body structure. Therefore, it becomes possible to effectively counteract against a lateral force applying from a side to the body upper section 3 (e.g. upon a side impact or a rollover).

Although the present invention is explained as above with reference to the embodiment, the present invention is not limited to the above-explained embodiment. The scope of the present invention is determined according to the claims.

Note that the present invention is not limited to the above-explained embodiment. For example, in the LFT-D molding in the above embodiment, the preliminarily extruded compound is set in the molding die, and then the compression molding is done. However, in the LFT-D molding, there may be a case where the compound is extruded into the molding die before the compression molding is done. In any cases, in the LFT-D molding, an LFT compound is formed just before the compression molding, and then the LFT compound is compression-molded together with a metal part(s) in the molding die.

REFERENCE SIGNS LIST 1 body side section
2 body lower section
3 body upper section
4 body front section
10 outer side panel (first composite component)
10a inner side panel (first composite component)
20 floor panel (second composite component)
20a side sill inner panel (side sill inside member: second composite component)
20b rear bumper reinforcement (rear bumper reinforcing member: second composite component)
30 roof bow (first composite component)
30a roof panel (first composite component: modified example)
30b roof rail (first composite component)
11, 11a, 21, 21a, 21b, 31 metal plate
12, 12a, 22, 22a, 22b, 32 fiber reinforced thermoplastic portion (FRTP portion)
23 opening
24 planar portion
120, 220 lining layer
121, 221 reinforcing rib (rib, triangular rib)

The invention claimed is:

1. A vehicle body structure comprising:
a body side section that is configured of a first composite component that comprises a metal plate and a fiber reinforced thermoplastic portion containing discontinuous fibers; and
a body lower section that is configured of a second composite component that comprises a metal plate and a fiber reinforced thermoplastic portion containing discontinuous fibers, wherein
the fiber reinforced thermoplastic portion of the first composite component is configured to include a plurality of reinforcements formed on the metal plate,
the fiber reinforced thermoplastic portion of the second composite component is configured to include a planar portion whose circumference is integrated with the metal plate,
the body side section and the body lower section are adjoined by adjoining the metal plate of the first composite component and the metal plate of the second composite component, and
the discontinuous fibers contained in the fiber reinforced thermoplastic portion of the second composite component are longer than the discontinuous fibers contained in the fiber reinforced thermoplastic portion of the first composite component.

2. The vehicle body structure according to claim 1, wherein
the planar portion is infilled in an opening formed on the metal plate to close the opening.

3. The vehicle body structure according to claim 1, wherein
the body side section and the body lower section are directly adjoined by welding the metal plate of the first composite component and the metal plate of the second composite component.

4. The vehicle body structure according to claim 1, wherein
the plurality of reinforcements is a plurality of reinforcing ribs.

5. The vehicle body structure according to claim 4, wherein
the fiber reinforced thermoplastic portion of the first composite component is configured to include a lining layer formed on the metal plate and the plurality of reinforcing ribs raised from the lining layer.

6. The vehicle body structure according to claim 4, wherein,
in the body side section, an amount of fiber reinforced thermoplastic resin used in the reinforcing ribs provided on a lower side of a vehicle body is larger than an amount of fiber reinforced thermoplastic resin used in the reinforcing ribs provided on an upper side of the vehicle body.

7. The vehicle body structure according to claim 1, wherein
the body lower section includes a side sill inside member as the second composite component,
the fiber reinforced thermoplastic portion of the side sill inside member is configured to include a lining layer formed on the metal plate and reinforcing ribs raised from the lining layer, and
an amount of fiber reinforced thermoplastic resin used in the reinforcing ribs provided along circumferential edges, including the side sill inside member, of the body lower section is larger than an amount of fiber reinforced thermoplastic resin used in the reinforcing ribs provided in a center portion of the body lower section.

8. The vehicle body structure according to claim 7, wherein
the discontinuous fibers in the lining layer of the side sill inside member are oriented in a longitudinal direction of the vehicle body structure.

9. The vehicle body structure according to claim 7, wherein
the discontinuous fibers in the lining layer of the side sill inside member are longer than the discontinuous fibers in the fiber reinforced thermoplastic portion that forms the planar portion.

10. The vehicle body structure according to claim 7, wherein
the body lower section further includes a rear bumper reinforcing member as the second composite component,
a lining layer made of the fiber reinforced thermoplastic portion of the second composite component is formed on an inner face of a reinforcing member that is the metal plate that configures the rear bumper reinforcing member, and
the discontinuous fibers in the fiber reinforced thermoplastic portion that forms the lining layer of the rear bumper reinforcing member are oriented in a lateral direction of the vehicle body structure.

11. The vehicle body structure according to claim 1, further comprising:
a body front section made of metal, wherein
the body front section is directly adjoined with the metal plate of the body lower section or with the metal plate of the body side section.

12. The vehicle body structure according to claim 1, further comprising:
a body upper section that configures a roof of a vehicle body, wherein
the body upper section is configured of the first composite component, and
the body side section and the body upper section are directly adjoined with each other by welding of the metal plates of the first composite components.

13. The vehicle body structure according to claim 12, wherein
the discontinuous fibers in the fiber reinforced thermoplastic portion of the first composite component of the body upper section are oriented in a lateral direction of the vehicle body structure.

* * * * *